United States Patent [19]

Grant et al.

[11] 3,957,945

[45] May 18, 1976

[54] CHEMICAL ISOLATION OF $^{82}$SR FROM PROTON-IRRADIATED Mo TARGETS

[75] Inventors: Patrick M. Grant, Los Alamos; Milton Kahn, Albuquerque; Harold A. O'Brien, Jr., Los Alamos, all of N. Mex.

[73] Assignee: The United States of America as represented by the United States Energy Research and Development Administration, Washington, D.C.

[22] Filed: Aug. 21, 1974

[21] Appl. No.: 499,222

[52] U.S. Cl. .................................... 423/2; 423/249

[51] Int. Cl.$^2$ ...................... B01J 1/10; C22B 26/20; C01F 11/16

[58] Field of Search ............................... 423/2, 249

[56] References Cited

UNITED STATES PATENTS

| | | | |
|---|---|---|---|
| 3,154,500 | 10/1964 | Jansen, Jr. et al. | 423/7 X |
| 3,574,531 | 4/1971 | Schulz | 423/10 |

OTHER PUBLICATIONS

Yano et al., Journal of Nuclear Medicine, Vol. 9, No. 7, 1968, pp. 412–415.

Hupf et al., International Journal of Applied Radiation and Isotopes, Vol. 18, No. 6, June, 1967, pp. 417–420.

*Primary Examiner*—Benjamin R. Padgett
*Assistant Examiner*—Christine M. Nucker
*Attorney, Agent, or Firm*—Dean E. Carlson; Paul D. Gaetjens

[57] ABSTRACT

Spallation reactions are induced in Mo targets with 200-800 MeV protons to produce microcurie to millicurie amounts of a variety of radionuclides. A six-step radiochemical procedure, incorporating precipitation, solvent extractions, and ion exchange techniques, has been developed for the separation and purification of Sr radioactivities from other spallation products and the bulk target material. Radiostrontium can be quantitatively recovered in a sufficiently decontaminated state for use in biomedical generator development.

1 Claim, 1 Drawing Figure

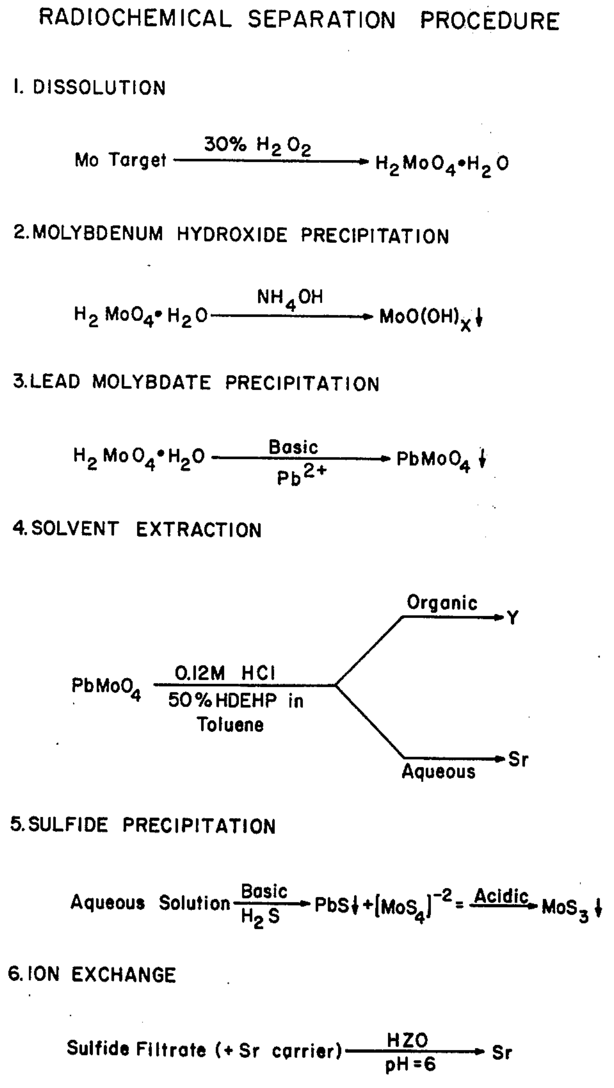

RADIOCHEMICAL SEPARATION PROCEDURE

1. DISSOLUTION $$\text{Mo Target} \xrightarrow{30\%\ H_2O_2} H_2MoO_4 \cdot H_2O$$

2. MOLYBDENUM HYDROXIDE PRECIPITATION $$H_2MoO_4 \cdot H_2O \xrightarrow{NH_4OH} MoO(OH)_x \downarrow$$

3. LEAD MOLYBDATE PRECIPITATION $$H_2MoO_4 \cdot H_2O \xrightarrow[Pb^{2+}]{\text{Basic}} PbMoO_4 \downarrow$$

4. SOLVENT EXTRACTION $$PbMoO_4 \xrightarrow[\text{50\% HDEHP in Toluene}]{\text{0.12M HCl}} \text{Organic} \rightarrow Y$$

$$PbMoO_4 \xrightarrow[\text{50\% HDEHP in Toluene}]{\text{0.12M HCl}} \text{Aqueous} \rightarrow Sr$$

5. SULFIDE PRECIPITATION $$\text{Aqueous Solution} \xrightarrow[H_2S]{\text{Basic}} PbS\downarrow + [MoS_4]^{-2} = \xrightarrow{\text{Acidic}} MoS_3\downarrow$$

6. ION EXCHANGE $$\text{Sulfide Filtrate (+ Sr carrier)} \xrightarrow[pH=6]{HZO} Sr$$

CHEMICAL ISOLATION OF $^{82}$SR FROM PROTON-IRRADIATED MO TARGETS

BACKGROUND OF THE INVENTION

1. Field of the Invention

This invention is concerned with isotope production by spallation reactions in selected targets by energetic protons, and consequently a broad spectrum of primarily neutron-deficient species is generated during the course of an irradiation. This invention discloses a novel method of separating and purifying $^{82}$Sr from irradiated Mo targets. Strontium-82 has a half life of 25 days and decays by pure electron capture to the ground state of its 75-second daughter, $^{82}$Rb. Rubidium-82 in turn decays, by 95% positron emission and 5% electron capture, to stable $^{82}$Kr and exhibits several prominent gamma rays. It is because such a shortlived alkali metal activity is available from a long-lived parent that the availability of $^{82}$Sr is of interest for biomedical studies. The useful shelf life of the system will be determined by the precursor activity, while the very short half life of $^{82}$Rb will keep the radiation dose to the patient low. With a suitable positron imaging device, this generator system appears to have considerable potential medical applications in cases where repeated, rapid, dynamic blood-flow information would be of value. Such instances would include investigations in coronary occlusion, cardiac output, arteriography, and tumor vascularity. A $^{82}$Rb generator could be a very effective diagnostic tool in the study of heart diseases.

2. Prior Art

To the inventors' knowledge, no one has previously used Mo targets to produce radiostrontium; consequently, such a complete and quantitative recovery of Sr from Mo is believed to be novel. Others have produced $^{82}$Sr with other targets and nuclear reactions, however. E.g., workers at the Donner Laboratory of the Lawrence Berkeley Laboratory irradiated Rb and Kr targets in the 88-in. cyclotron to produce $^{82}$Sr and then chemically purified it by ion exchange. Y. Yano and H. O. Anger, J. Nucl. Med. 9 412 (1968).

SUMMARY OF THE INVENTION

The essential steps of the invention are as follows:

1. Dissolution $$\text{Mo Target} \xrightarrow{30\%\ H_2O_2} H_2MoO_4.H_2O$$

2. Molybdenum Hydroxide Precipitation $$H_2MoO_4.H_2O \xrightarrow{NH_4OH} MoO(OH)_X\downarrow$$

3. Lead Molybdate Precipitation $$H_2MoO_4.H_2O \xrightarrow[Pb^{2+}]{\text{basic}} PbMoO_4\downarrow$$

4. Solvent Extraction $$PbMoO_4 \xrightarrow[\text{50\% HDEHP in toluene}]{0.12\text{ M HCl}} \begin{cases} \xrightarrow{\text{organic}} Y \\ \xrightarrow[\text{aqueous}]{} Sr \end{cases}$$

5. Sulfide Precipitation $$\text{Aqueous Solution} \xrightarrow[H_2S]{\text{basic}} PbS + [MoS_4]^{-2} \xrightarrow{\text{acidic}} MoS_3\downarrow$$

6. Ion Exchange $$\text{Sulfide Filtrate (+ Sr carrier)} \xrightarrow[pH = 6]{HZO} Sr$$

BRIEF DESCRIPTION OF THE DRAWINGS

The FIGURE shows a flow sheet of the radiochemical separation procedure of this invention.

DESCRIPTION OF THE PREFERRED EMBODIMENT

The procedure for proton bombardments has been to insert an experimental packet into the linear accelerator beam at some convenient position and irradiate for from 1 to 20 $\mu$A-hours of integrated intensity. Each packet has consisted of a number of metal foils sandwiched together and maintained at a constant position in the beam by an external holder; foils irradiated to date have included thin targets (0.02–0.13 mm thick) of Mo and Al for a peripheral spallation cross-section study as well as thicker targets (usually 0.51 mm) of Mo for use in the chemical separation development. The Mo so employed has been spectrochemically assayed to be at least 99.95% pure.

Chemical Procedure

A schematic representation of the following six steps of the complete chemical procedure is given in FIG. 1.

Step 1

After allowing several days for the irradiated thick Mo foils to decay to reasonable activity levels, a target is selected and radiographed, and the hot spot is cut away from the surrounding inactive metal. The radioactive Mo section is then immersed for 1–2 minutes in a chromic acid cleaning solution to remove surface contaminants, rinsed in distilled water, dried, and weighed. Typical Mo weights ranged from 1–10 g. The metal is then dissolved with 30% $H_2O_2$ and mild heating. Approximately 10–20 ml of peroxide is required for each gram of Mo dissolved, and the resulting molybdic acid solution ($H_2MoO_4.H_2O$) has a brilliant yellow color. After complete dissolution of the metal, the excess $H_2O_2$ is driven off with gentle heat, and the Mo concentration is adjusted to about 1 M through evaporation and the addition of concentrated $NH_4OH$ (final $NH_4OH$ concentration ≈ 3–4 M). Some degree of caution and care has to be exercised during these steps as there is a large tendency for the Mo to escape from solution by means of a mass transport mechanism. Removing the residual peroxide from solution has the effect of turning the solution nearly colorless from its original bright yellow appearance.

Step 2

After so basifying the molybdic acid solution and eliminating the excess peroxide, a small amount of yellow-brown precipitate drops out of solution and carries with it large amounts of tracer Zr and Y. This solid readily dissolves in dilute HCl and is thought to be molybdenum (V) or (VI) hydroxide (hydrous molybdenum oxides) or a mixture of the two species. The precipitate is removed from the mother liquid, and the solution is passed on to the next step in the radiochemical procedure.

Step 3

This alkaline, colorless molybdate solution is a good medium for the subsequent precipitation of $PbMoO_4$. To that end, 5 mg of $Pb^{2+}$ from a standard aqueous $Pb(NO_3)_2$ solution is added to the filtrate, and the white precipitate forms immediately. The suspension is then stirred and heated on a steam bath for 1–2 hours, the solid centrifuged and separated from the supernatant liquid, and the precipitated $PbMoO_4$ washed several times with a basic 0.1 M $NH_4Cl$ solution.

Step 4

The next effort is the complete separation of Sr from Y, since $^{88}Y$ has a great potential use for photoneutron sources in the safeguards program and other areas of research. This is effectively done by solvent extraction with a 50% bis-(2-ethyl-hexyl) phosphoric acid (HDEHP) solution is toluene; therefore, 10 ml of 0.12 M HCl and 10 ml of the HDEHP solution are added to the $PbMoO_4$ precipitate, and the mixture is equilibrated on a Burrell wrist-action shaker for 1–2 hours. This extensive shaking time is necessitated by the fact that $PbMoO_4$ is not appreciably soluble in 0.12 M HCl, although complete disappearance of the solid is observed to occur after a sufficiently long HDEHP extraction. After separating the two phases, the aqueous fraction containing the Sr is used for the remainder of this experiment, while the organic fraction containing $^{88}Y$ along with some radioimpurities is set aside.

Step 5

The aqueous phase from the HDEHP solvent extraction is next subjected to a pH-adjusted sulfide precipitation in order to remove macroscopic amounts of Pb and Mo from the system. The solution is made basic with 0.5 ml of 3.7 M $NH_4OH$, and this gives rise to the formation of a white precipitate, probably $Pb(OH)_2$. $H_2S$ is then bubbled through the suspension for about 0.5 hour. The white solid disappears, and a brownish-black precipitate forms in the solution, thus indicating the formation of PbS. The mixture is acidified with 0.5 ml of 7–8 M $HNO_3$, steam-heated for 10–15 minutes, cooled to room temperature, and filtered. The variation from alkaline to acidic medium is necessary for the complete precipitation of Mo, through a thiomolybdate intermediate, as $MoS_3$.

Step 6

As a final purification step, an ion exchange procedure employing the inorganic exchange hydrous zirconium oxide (HZO) is used. The filtrate from the previous sulfide precipitation step is heated to drive off any excess $H_2S$ and adjusted to pH ≈ 6.0 with $NH_4OH$; enough Sr $(NO_3)_2$ is added to bring the $Sr^{2+}$ concentration to approximately 0.005 M. The solution is then passed through a column of untreated 100–200 mesh HZO-1 ion exchange crystals obtained from Bio Rad Laboratories. Typical column dimensions are 0.8 cm in diameter and 4 cm in length, while representative flow rates are of the order of 0.1 ml/min.

The thin-target cross section for $^{82}Sr$ production in proton-irradiated Mo targets has been measured to be 22 mb at 496 MeV and 15 mb at 590 MeV. Extrapolating these results to the energy and intensity expected at the Clinton P. Anderson Meson Physics Facility beam stop, it is estimated that many kilocuries/year of this isotope can be produced. A chemical procedure has been developed which gives quantitative yields (94 ± 2%) of Sr radioactivities decontaminated from at least nine other spallation-produced radioelements (Tc, Nb, Zr, Y, Rb, Se, As, Zn, and Co). The final solution is slightly acidic, contains both $^{82}Sr$ and $^{85}Sr$ along with ammonium, nitrate, and chloride ions, and is acceptable for the development of a suitable biomedical generator. In this respect, the small amount of Rb activity which has sometimes been observed in the HZO eluent is of no practical consequence since it will be removed at the first use of the generator, leaving essentially a pure radiostrontium system.

What is claimed is:

1. A method of chemically isolating $^{82}Sr$ from proton-irradiated Mo targets comprising:

a. dissolving the Mo metal target containing the $^{82}Sr$, b. making basic the dissolved Mo target solution, removing the precipitate from the mother liquid, c. adding Pb to the separated mother liquid to form a lead-molybdate-$^{82}Sr$ precipitate, d. dissolving the lead-molybdate-$^{82}Sr$ precipitate by the addition of a mixture of hydrochloric acid and bis-(2-ethyl-hexyl) phosphoric acid in toluene which forms both an aqueous and organic phase in said solution, e. making basic the aqueous phase of said solution, bubbling hydrogen sulfide through the aqueous phase until the lead is precipitated, adding sufficient acid to cause the molybdenum to precipitate, and f. adjusting the pH of the resulting $^{82}Sr$-containing filtrate to about 6.0 and passing said filtrate through an ion exchange column consisting of hydrous zirconium oxide which absorbs all impurities and allows only the radioactive strontium to pass.

* * * * *